United States Patent [19]

Katoh et al.

[11] 3,774,980

[45] Nov. 27, 1973

[54] SLEEVE BEARING ASSEMBLY

[75] Inventors: Tomomi Katoh, Masayasu Aono, Toshio Fujinami, all of Tokyo, Japan

[73] Assignee: Sansui Electric Co., Ltd., Tokyo, Japan

[22] Filed: Dec. 6, 1971

[21] Appl. No.: 205,227

[30] Foreign Application Priority Data

Dec. 30, 1970 Japan...45/133697 (Utility Model)

[52] U.S. Cl. .................................. 308/15, 308/237

[51] Int. Cl. .......................................... F16c 35/02

[58] Field of Search ...................... 308/237, 238, 15

[56] References Cited

UNITED STATES PATENTS

| | | | |
|---|---|---|---|
| 560,214 | 5/1896 | Hyde | 308/15 |
| 337,953 | 3/1886 | Hill | 308/237 |
| 3,084,003 | 4/1963 | Matt et al. | 308/237 |

*Primary Examiner*—Charles J. Myhre
*Assistant Examiner*—Barry Grossman
*Attorney*—Richard C. Sughrue et al.

[57] ABSTRACT

A bearing assembly for rotatably supporting a capstan shaft of a tape recorder comprises a cylindrical sleeve bearing formed of brass which is loosely supported by a cylindrical casing having internal projections for preventing axial shifting of the brass cylinder relative to the casing. Radial projections from the cylindrical casing are received within axially extending grooves formed on the outer periphery of the brass sleeve bearing to prevent the sleeve from rotating relative to the casing.

2 Claims, 2 Drawing Figures

PATENTED NOV 27 1973 3,774,980

SLEEVE BEARING ASSEMBLY

BACKGROUND OF THE INVENTION

1. Field of the Invention

This invention relates to an improved sleeve bearing assembly for rotatably suporting a capstan shaft of a tape recorder or the like.

2. Description of the Prior Art

Hithterto, bearing assemblies have been achieved by inserting a rotary shaft in a brass sleeve which is pressure-fitted and fixedly secured to a metal casing, the assembly allowing sliding contact to the rotary shaft with respect to the brass sleeve. However, in terms of the cylindricity, roundness and the like of the inner and outer peripheries of the metal casing, the brass sleeve and the rotary shaft, errors in machining have been unavoidable, and it is not possible to give ideal contact between the brass sleeve and the rotary shaft. Thus, the ability of the bearing to function correctly depends largely upon the accuracy in machining of the components. Further, the machining errors result in a generation of "playing" or "flutter" in the tape recorder employing the bearing to support the capstan shaft for rotation.

SUMMARY OF THE INVENTION

Accordingly, the present invention provides a bearing assembly which is adapted to favorably receive a rotary shaft, characterized by satisfactory contact between the cylindrical brass bearing and the rotary shaft supported thereby which is obtained by an economical machining operation, while permitting easy assembly of the components of the bearing assembly.

DESCRIPTION OF THE PREFERRED EMBODIMENT

Figure 1:
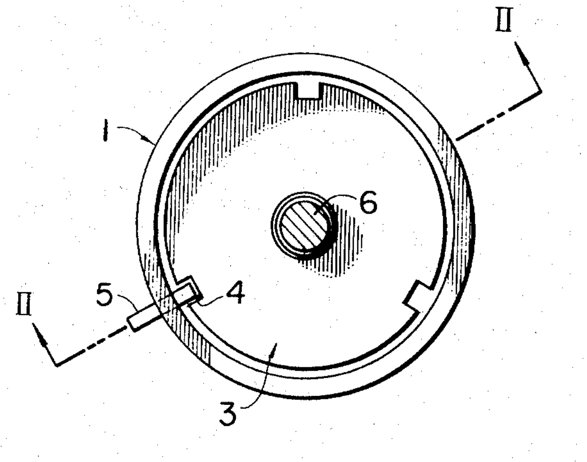
FIG. 1 is a plan view of the improved bearing assembly of the present invention.
Figure 2:
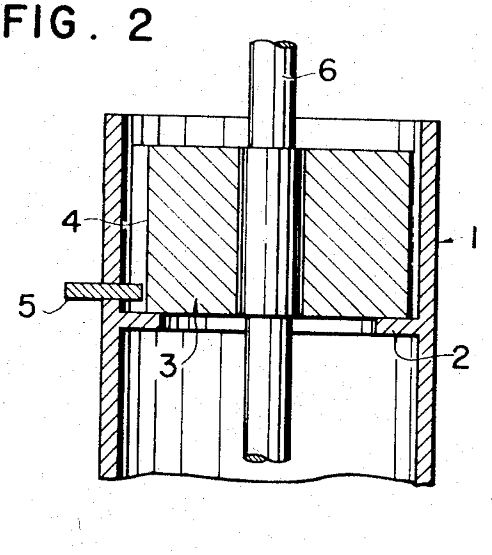
FIG. 2 is a sectional elevational view of the assembly of FIG. 1.

The present invention is explained with reference to the drawings. The improved bearing assembly of the present invention is described as an example where a capstan shaft of a tape recorder is supported by the bearing assembly and wherein a cylindrical metal casing 1 having an appropriate outer diameter is mounted within a housing (not shown) of a tape recorder, the inner surface of the casing provided with a number of projections 2. Supported within the metal casing 1 is a cylindrical brass bearing 3 formed of a conventional brass bearing alloy which is of such dimension that the bottom of the brass cylinder contacts the projections 2 so that the brass sleeve or cylinder is supported thereby and does not move further downwardly in an axial direction under gravity influence. The cylindrical brass bearing 3 is so dimensioned as to have an outer diameter which is smaller than the inner diameter of the metal casing 1, so that there occurs a gap of appropriate size between the outer periphery of the cylindrical brass bearing 3 and the inner periphery of the cylindrical metal casing 1. The brass cylinder 3 has formed on its outer periphery, a plurality of circumferentially spaced grooves 4 which extend axially and, in the illustrated embodiment, vertically, being spaced equally about the periphery. Further, for each of the grooves, there are projections 5 which may be either integral with the cylindrical metal case 1 or may be separately formed, but extend radially inward from the inner periphery of the metal casing 1, so as to fit within the grooves 4 of the cylindrical brass bearing 3. The projections 5, when engaging the grooves 4, cause the cylindrical brass bearing 3 to be locked in terms of rotation relative to the cylindrical casing 1 which supports the same. Thus, the casing 1 not only supports the brass cylinder 3 vertically, but prevents the cylinder 3 from rotating relative to the casing and the capstan shaft supported thereby. In the illustrated embodiment, a rotary shaft such as a capstan shaft 6 is inserted within the center of the cylindrical brass bearing 3 and is received for free rotation therein.

In the bearing assembly as described above, there is a gap between the metal casing 1 and the brass cylinder 3 so that the metal bearing 3 may be displaced appropriately within the limits of the gap due to machining error which causes defects in cylindricity or roundness of the inner and outer peripheries and thus can absorb or take up for these machining errors. This displacement in the desired direction maintains and permits desired contact between the inner surface of the brass bearing 3 and the capstan shaft 6 by placing of the cylindrical brass bearing 3 in any given direction. Although displacement at right angle to the axis of the brass bearing and its supported shaft 6 may occur readily within the limits of the gap defined by the casing and the brass bearing 3, the engagement between the projections 5 and the grooves 4 prevents any rotation of the bearing without materially affecting the function of the bearing while permitting the limited displacement.

It should be noted that the present invention is not limited to the described embodiment, and the invention may be realized in modified form without departing from the scope of the present invention, for instance, a rotary stop mechanism for the cylindrical brass bearing 3 may be accomplished by forming projections on the brass bearing and appropriate recesses within the inner periphery of the metal casing 1.

As explained above, the bearing assembly according to the present invention is characterized by the gap which is formed between the brass bearing which receives the rotary shaft and the metal casing which supports the bearing and the rotary stop mechanism which is effective to prevent rotation of the brass bearing relative to the metal casing, so that the desired accuracy in machining can be held to minimum in economic and easy machining operation, because any error resulting from the machining process is absorbed by the novel structure of the present invention, while desirable contact surfaces may be readily obtained between the rotary shaft and the brass bearing to allow the rotary shaft to be smoothly received within the cylindrical bearing.

What is claimed is:

1. A bearing assembly comprising:

a cylindrical metal bearing adapted to axially receive a rotary shaft for rotation therein, a cylindrical metal casing member concentrically surrounding said bearing member and having an internal diameter in excess of the outer diameter of said bearing member permitting a loose fit therebetween, means preventing axial movement of said bearing member relative to said casing member, and means for preventing one member from rotating relative to the other member during rotation of said shaft, said means for preventing rotation comprising at least one axially extending slot within the surface of one of said members facing the other said member, and at least one radial projection carried by said other member and received by said slot, said projection having a thickness less than said slot width, permitting a loose fit therebetween.

2. The bearing assembly as claimed in claim 1, wherein said bearing axis is vertical and said means for preventing axial movement comprises projections on the internal surface of said casing member in contact with the bottom of said bearing member to prevent said bearing member from falling relative to said casing member.

* * * * *